(12) United States Patent
Kirshon et al.

(10) Patent No.: US 11,870,699 B1
(45) Date of Patent: Jan. 9, 2024

(54) TECHNIQUES FOR MULTI-CHANNEL NETWORK CONGESTION CONTROL

(71) Applicant: Ottopia Technologies Ltd., Tel Aviv (IL)

(72) Inventors: Alexander Kirshon, Netanya (IL); Ravid Cohen, Nataf (IL); Niv Maman, Herzliya (IL)

(73) Assignee: OTTOPIA TECHNOLOGIES LTD., Tel Aviv (IL)

( * ) Notice: Subject to any disclaimer, the term of this patent is extended or adjusted under 35 U.S.C. 154(b) by 46 days.

(21) Appl. No.: 17/809,178

(22) Filed: Jun. 27, 2022

(51) Int. Cl.
*H04L 47/122* (2022.01)
*H04L 43/106* (2022.01)
*H04L 43/0882* (2022.01)
*H04L 47/11* (2022.01)

(52) U.S. Cl.
CPC ........ *H04L 47/122* (2013.01); *H04L 43/0882* (2013.01); *H04L 43/106* (2013.01); *H04L 47/11* (2013.01)

(58) Field of Classification Search
None
See application file for complete search history.

(56) References Cited

U.S. PATENT DOCUMENTS

| | | | |
|---|---|---|---|
| 6,816,492 B1 * | 11/2004 | Turner | H04L 49/1515 370/518 |
| 6,920,120 B2 | 7/2005 | Huang et al. | |
| 7,782,901 B2 | 8/2010 | Wang | |
| 9,178,822 B2 | 11/2015 | Norp et al. | |
| 9,542,749 B2 | 1/2017 | Freedman et al. | |

(Continued)

FOREIGN PATENT DOCUMENTS

| | | |
|---|---|---|
| CN | 101404622 A | 4/2009 |
| CN | 111431822 A | 7/2020 |

(Continued)

OTHER PUBLICATIONS

Ashutosh Srivastava. "MPCC : Online learning multipath congestion control". Apr. 5, 2022 on reproducing research, transport layer, multipath. https://witestlab.poly.edu/blog/mpcc-online-learning-multipath-congestion-control/.

(Continued)

*Primary Examiner* — Angela Nguyen
(74) *Attorney, Agent, or Firm* — M&B IP Analysts, LLC (57) ABSTRACT

A system and method for multi-channel network congestion control. A method includes establishing multi-channel control over a plurality of communication channels by connecting each of the plurality of communication channels to a scheduling component and to a synchronizing component; determining a packet routing scheme for a plurality of packets of a data stream based on feedback from each of the plurality of communication channels, wherein the packet routing scheme includes a routing of each packet to a respective communication channel of the plurality of communication channels; and sending the plurality of packets via their respective communication channels, wherein each of the sent packets includes timing data, wherein the synchronizing component is configured to synchronize the plurality of packets based on the timing data of each packet and to reconstruct the data stream using the synchronized packets.

19 Claims, 5 Drawing Sheets

(56) References Cited

U.S. PATENT DOCUMENTS

| | | | |
|---|---|---|---|
| 10,791,485 | B2 | 9/2020 | Patil et al. |
| 11,018,791 | B2 | 5/2021 | Götz et al. |
| 11,051,134 | B2 | 6/2021 | Loon et al. |
| 11,304,092 | B2 | 4/2022 | Park et al. |
| 2007/0015525 | A1 | 1/2007 | Beming et al. |
| 2007/0025242 | A1 | 2/2007 | Tsang |
| 2016/0218818 | A1* | 7/2016 | Lorenz ............... H04J 3/0697 |
| 2019/0246221 | A1* | 8/2019 | Shariati ............... H04L 1/00 |
| 2020/0288316 | A1 | 9/2020 | Kanagarathinam et al. |
| 2021/0168905 | A1 | 6/2021 | Yu |

FOREIGN PATENT DOCUMENTS

| | | |
|---|---|---|
| DE | 102020206872 A1 | 12/2021 |
| WO | 2021163684 A1 | 8/2021 |

OTHER PUBLICATIONS

Science Direct. Transport Layer Protocol. https://www.sciencedirect.com/topics/computer-science/transport-layer-protocol.

T. Viernickel, A. Froemmgen, A. Rizk, B. Koldehofe and R. Steinmetz, "Multipath QUIC: A Deployable Multipath Transport Protocol," 2018 IEEE International Conference on Communications (ICC), 2018, pp. 1-7, doi: 10.1109/ICC.2018.8422951. https://ieeexplore.ieee.org/document/8422951.

* cited by examiner

TECHNIQUES FOR MULTI-CHANNEL NETWORK CONGESTION CONTROL

TECHNICAL FIELD

The present disclosure relates generally to network congestion avoidance algorithms, and more specifically to multi-channel network congestion control algorithms.

BACKGROUND

Network congestion in data networking is a reduced quality of service that occurs when a network node or link is carrying more data than it can handle. Effects of network congestion might include queuing delays, packet losses, or blocking of new connections. When network congestion occurs, network throughput may decrease or may only increase slightly even when the amount of offered load is increased. Reducing network congestion therefore improves network communications.

Because of the above challenges, some solutions for congestion control in networks have been developed. As an example, the Transmission Control Protocol (TCP) is a common transport layer protocol which supports congestion control. Some of these existing solutions are designed for multi-channel operations, i.e., to enable congestion control when devices may communicate over multiple different channels. Such existing solutions include solutions that leverage multiple network interfaces such as WiFi and LTE.

More specifically, some multipath protocols have been developed to enable multipath communication. As an example, Multipath TCP (MPTCP) is the multipath extension of the standard TCP. Some of these multipath protocols have congestion control features. These existing multipath congestion control algorithms are specifically designed for multipath communications. For example, in MTCP. Each path has its own congestion control process in order to react to congestion observed in that path, and congestion control parameters are linked across paths in order to move traffic away from the most congested paths.

Additional techniques for multi-channel congestion control, particularly techniques which help realize improved network communication performance, are highly desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for multi-channel network congestion control. The method comprises: establishing multi-channel control over a plurality of communication channels by connecting each of the plurality of communication channels to a scheduling component and to a synchronizing component; determining a packet routing scheme for a plurality of packets of a data stream based on feedback from each of the plurality of communication channels, wherein the packet routing scheme includes a routing of each packet to a respective communication channel of the plurality of communication channels; and sending the plurality of packets via their respective communication channels, wherein each of the sent packets includes timing data, wherein the synchronizing component is configured to synchronize the plurality of packets based on the timing data of each packet and to reconstruct the data stream using the synchronized packets.

Certain embodiments disclosed herein also include a non-transitory computer readable medium having stored thereon causing a processing circuitry to execute a process, the process comprising: establishing multi-channel control over a plurality of communication channels by connecting each of the plurality of communication channels to a scheduling component and to a synchronizing component; determining a packet routing scheme for a plurality of packets of a data stream based on feedback from each of the plurality of communication channels, wherein the packet routing scheme includes a routing of each packet to a respective communication channel of the plurality of communication channels; and sending the plurality of packets via their respective communication channels, wherein each of the sent packets includes timing data, wherein the synchronizing component is configured to synchronize the plurality of packets based on the timing data of each packet and to reconstruct the data stream using the synchronized packets.

Certain embodiments disclosed herein also include a system for multi-channel network congestion control. The system comprises: a processing circuitry; and a memory, the memory containing instructions that, when executed by the processing circuitry, configure the system to: establish multi-channel control over a plurality of communication channels by connecting each of the plurality of communication channels to a scheduling component and to a synchronizing component; determine a packet routing scheme for a plurality of packets of a data stream based on feedback from each of the plurality of communication channels, wherein the packet routing scheme includes a routing of each packet to a respective communication channel of the plurality of communication channels; and send the plurality of packets via their respective communication channels, wherein each of the sent packets includes timing data, wherein the synchronizing component is configured to synchronize the plurality of packets based on the timing data of each packet and to reconstruct the data stream using the synchronized packets.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In accordance with various disclosed embodiments, congestion control is performed across multiple communication channels. Each communication channel, also referred to herein as simply a channel, is a physical transmission medium or a logical connection used to transmit at least data in the form of packets over one or more networks. Each channel represents a connection to a network via a respective network interface. As a non-limiting example, one of the channels may be a connection to the Internet as the network realized via a modem acting as the network interface. The disclosed embodiments therefore allow for performing congestion control with respect to devices having multiple network interfaces in order to optimize performance, for example, by maximizing reliability and/or minimizing latency. As a non-limiting example, the disclosed embodiments may be applied with respect to a drone having channels both via a cellular network and a satellite network, and congestion control may be performed across these cellular and satellite network channels.

In an embodiment, a scheduling component is configured to orchestrate the flow of data into individual channels. To this end, on a sending side, the scheduling component receives an incoming data stream, decides scheduling for sending portions of the data stream in the form of packets as well as the channel by which to send each packet, and transmits the packets via their respective channels. To facilitate the reorganization of packets on the receiving end, the scheduling component may be further configured to add information before sending each packet such as, but not limited to, timing data (e.g., timestamps). The scheduling component may be configured to analyze feedback from the individual channels in order to determine potential future congestion issues such that those potential future congestion issues can be utilized to make scheduling and channel decisions. The scheduling component may be further configured to select the protocols or algorithms to be used by each of the channels when transmitting packets.

In an embodiment, a synchronizing component is deployed on the receiving end is configured to receive the packets sent by the scheduling component and to redistribute packets to their original destinations. Timing data in the packets received by the synchronizing component is used to synchronize the packets and to reconstruct the original stream in accordance with its pre-split nature before the stream was broken up and sent over multiple channels. The reconstructed stream is forwarded to its original destination.

The disclosed embodiments allow provide techniques and system configurations which allow for adapting individual channel congestion control algorithms for multipath congestion control such that congestion control is performed across channels. The disclosed embodiments obtain improved performance with respect to performance measurements such as reliability and latency as compared to using individual single channel congestion control algorithms. Further, the disclosed embodiments allow for realizing multi-channel congestion control without requiring a native multi-channel congestion control algorithm deployed with respect to the different channels. More specifically, the disclosed embodiments can be deployed by leveraging feedback being sent in accordance with existing single channel congestion control algorithms in order to make scheduling decisions across multiple channels. Thus, the disclosed embodiments can provide multi-channel congestion control without requiring modifying the congestion control algorithms used for the individual channels. Alternatively, the disclosed embodiments can be realized by modifying an interface used for each individual channel.

Figure 1:
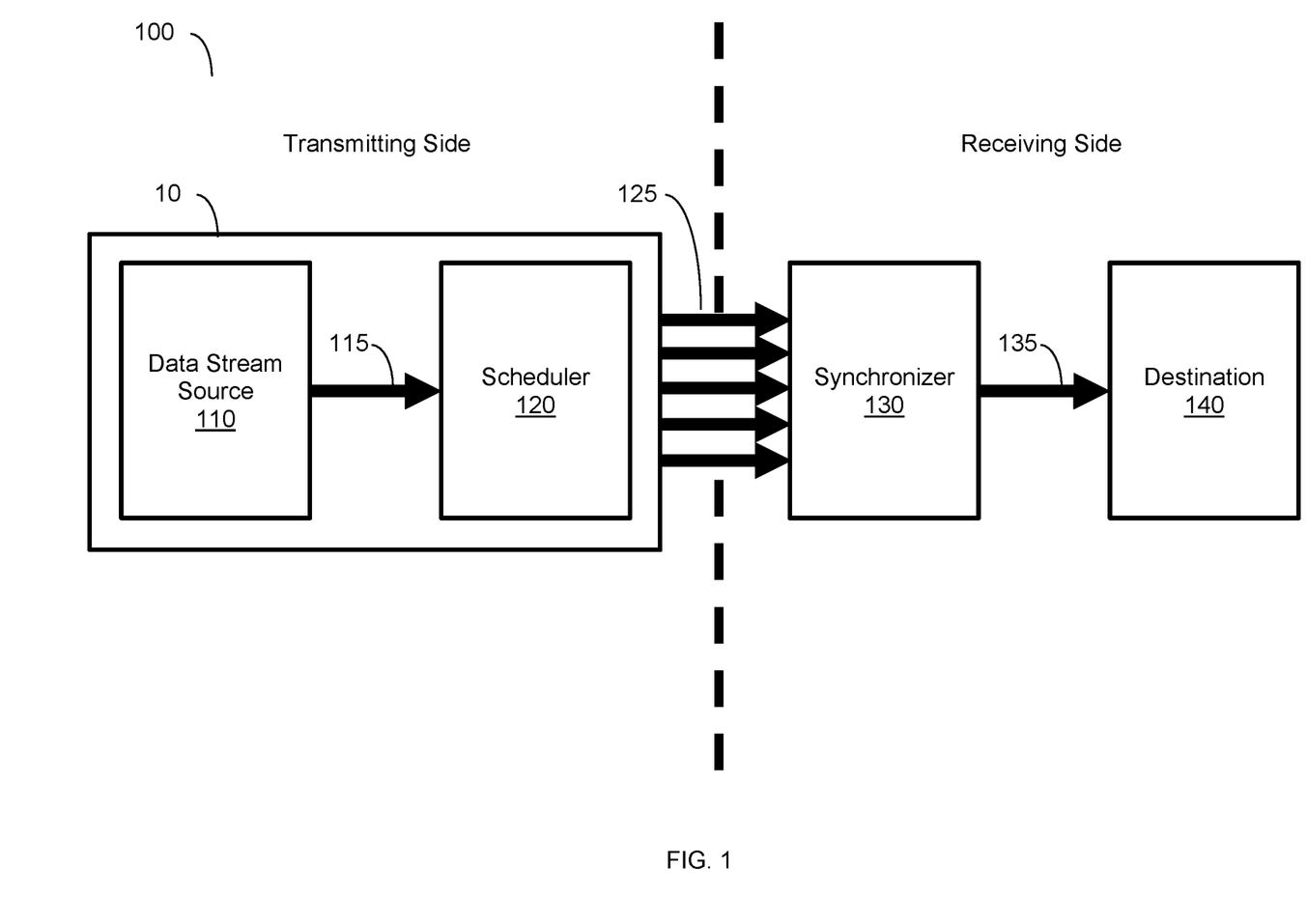
FIG. 1 is a network communications diagram utilized to describe various disclosed embodiments.

FIG. 1 is a network communications diagram 100 utilized to describe various disclosed embodiments. In the network communications diagram 100, a data stream source 110, a scheduler 120, a synchronizer 130, and a destination 140 communicate.

In the example implementation depicted in FIG. 1, the data stream source 110 and the scheduler 120 are logical software components of a transmitting device 10, but it should be noted that the data stream source 110 and the scheduler 120 can be realized via discrete hardware components without departing from the scope of the disclosure. In other embodiments, the instructions for performing the functions of both the data stream source 110 and the scheduler 120 may be included in the same software (e.g., the same program). In an example implementation, the transmitting device 10 is an end user device (e.g., a smartphone or drone), and the synchronizer 130 is or is installed on a server (not shown). Like the data stream source 110 and the scheduler 120, the synchronizer 130 and the destination 140 may be realized as logical components of the same hardware device in accordance with some disclosed embodiments (not shown).

As depicted in FIG. 1, on a transmitting side, the data stream source 110 sends a data stream 115 including packets (not shown) to the scheduler 120. The scheduler 120 is configured to break up the stream 115 into multiple sets of packets 125 to be sent to the destination 140. Each set of packets among the sets of packets 125 is sent over a respective channel (channels not depicted in FIG. 1) such that at least some sets of packets are sent over different channels than other sets of packets when congestion control is required to avoid potential congestion issues. In accordance with various disclosed embodiments, the packets of the sets of packets 125 may be enriched in order to aid in reconstruction of the data stream 115. For example, the packets may be enriched with timing data in the form of timestamps to allow for determining an appropriate order for the packets on the receiving side.

On the receiving side, the synchronizer 130 receives the packets of the sets of packets 125 sent by the scheduler 120. The synchronizer 130 is configured to synchronize the packets based on the timing data and to reconstruct the data stream 115 using the synchronized packets. The result is a reconstructed data stream 135, which the synchronizer 130 is configured to forward to the destination 140 (i.e., the original destination of the packets).

It should be noted that a single destination 140 is depicted in FIG. 1 for simplicity purposes, but that the disclosed embodiments can equally be extended to sending data to multiple destinations. Each reconstructed stream would include packets intended for a respective destination, and the reconstructed streams can therefore be forwarded to their respective destinations. Likewise, a single data stream source 110 is depicted in FIG. 1 for simplicity, but the disclosed embodiments can be applied to multiple data stream sources without departing from the scope of the disclosure using multiple schedulers (not shown) or a single scheduler (as depicted in FIG. 1).

Figure 2:
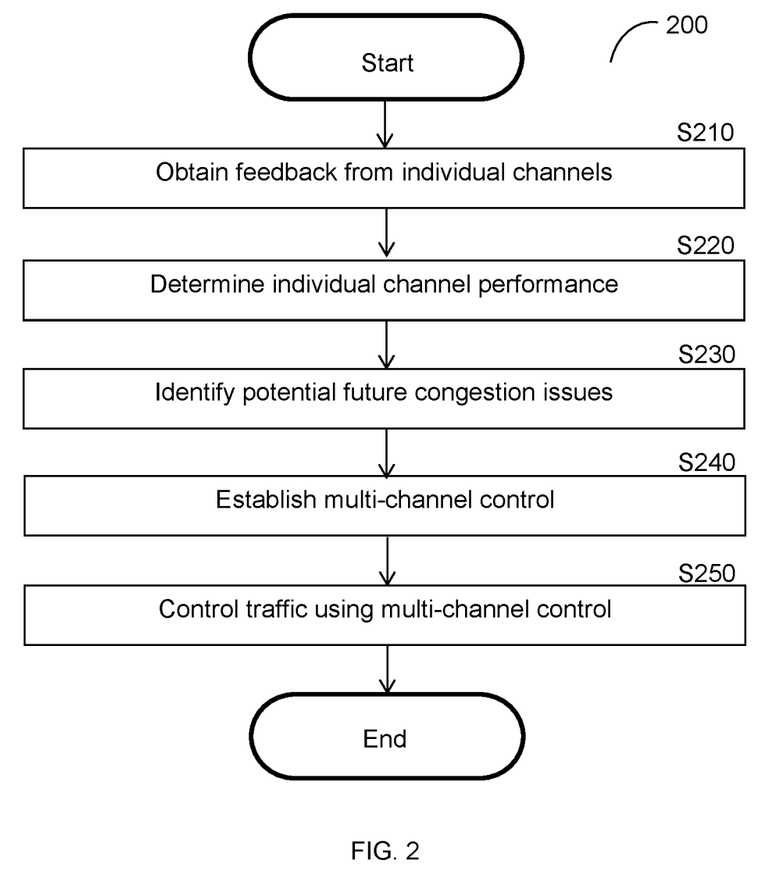
FIG. 2 is a flowchart illustrating a method for multi-channel network congestion control according to an embodiment.

FIG. 2 is a flowchart 200 illustrating a method for multi-channel network congestion control according to an embodiment. In an embodiment, the method is performed by the scheduler 120, FIG. 1.

At S210, feedback from multiple individual communication channels is obtained. In an example implementation, the feedback is received via network interfaces used for communicating via the respective channels. In various implementations, such feedback data is being sent to the device communicating via these channels. As a non-limiting example, when a data stream source is installed on a drone having multiple network interfaces such as a cellular network interface and a satellite network interface, the drone may receive respective feedback data through each interface.

At S220, the feedback from the individual communication channels is analyzed for performance. In an embodiment, the performance which is analyzed includes a responsiveness of each channel. The responsiveness may be defined with respect to an amount of time (e.g., an average amount of time) between identification of a congestion issue and occurrence of the congestion issue (e.g., as demonstrated by decrease in one or more performance metrics such as latency). The responsiveness may further be defined with respect to whether the congestion issues are identified before or after the congestion issues occur.

In an optional implementation, S220 may further include analyzing the feedback to determine a reliability of each protocol used by each channel. The reliability of different protocols may be used to select protocols to be used by channels when sending packets in accordance with certain disclosed embodiments.

At S230, potential future congestion issues are identified based on the feedback from the individual communication channels. In an embodiment, S230 includes performing statistical modeling with respect to responsiveness based on the feedback data and a data stream to be sent over channels in order to determine one or more anticipated drops in responsiveness which represent potential future congestion issues.

At S240, multi-channel control is established with respect to the multiple channels. In an embodiment, S240 includes connecting each of the channels to a scheduling component on a transmitting end (e.g., the scheduling component 120, FIG. 1) and to a synchronizing component on a receiving end (e.g., the synchronizing component 130, FIG. 1). Each of the scheduling component and the synchronizing component is a logical component or system and is configured to perform a respective portion of the disclosed embodiments. The scheduling component is connected to the channels such that it can access the channels to send packets, and the synchronizing component is connected to the channels such that it can access the channels to receive packets. To this end, connecting the scheduling component or the synchronizing component to a given channel may include establishing communication between the component and the channel.

By connecting the channels to the scheduling and synchronizing components configured to collectively perform the disclosed embodiments, control over the channels is established. Further, since the logic for congestion control is realized via the connected scheduling component, multi-channel congestion control may be established without requiring deploying the congestion control logic among the individual channels.

In some embodiment, S240 may optionally include modifying an interface of each channel (e.g., the network interface used to communicate via that channel). More specifically, a configuration of each interface may be modified in order to connect the scheduling and synchronizing components. Alternatively or additionally, additional logic may be used to reroute packets or otherwise cause the scheduling and synchronizing components to be able to intercept traffic going in to or coming out of any of the channels.

At S250, traffic is controlled using the multi-channel control established at S240. Controlling the traffic includes at least controlling which packets are sent via which channels and the schedule for sending those packets. Controlling the traffic may further include, but is not limited to, controlling the metadata sent in the packets, enriching the metadata sent in the packets, selecting protocols or algorithms to be used by the channels while transmitting certain packets, combinations thereof, and the like.

In this regard, it is noted that existing single channel congestion control solutions may address congestion issues by either buffering packets or returning signals indicating that packets cannot be sent currently. The disclosed embodiments provide an alternative way of addressing congestion using the existing single channel congestion control protocols by rerouting packets directed toward one channel into interfaces of one or more other channels, which may allow packets to be sent immediately without requiring buffering, thereby improving latency. The disclosed embodiments may further utilize a signal-generating component or otherwise may include generating return signals indicative of potential congestion control issues while attempting to mitigate such issues by rerouting packets.

Figure 3:
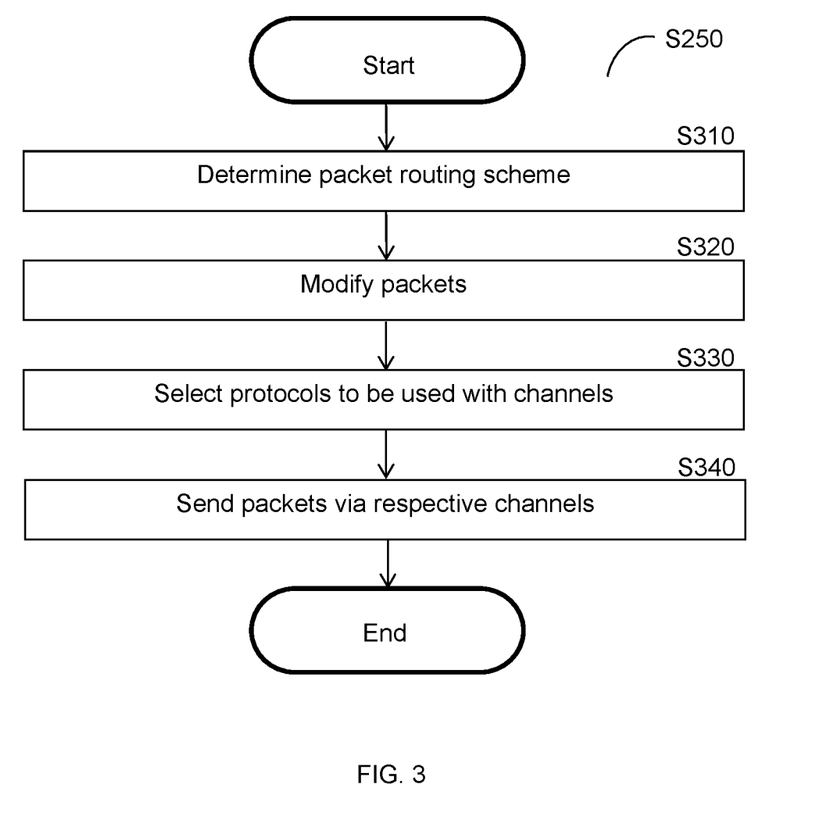
FIG. 3 is a flowchart illustrating a method for controlling network traffic according to an embodiment.

In an embodiment, traffic is controlled as now described with respect to FIG. 3. FIG. 3 is a flowchart S250 illustrating a method for controlling network traffic according to an embodiment.

At S310, a packet routing scheme is determined. In an embodiment, S310 includes selecting a channel by which each packet among packets of a data stream should be sent. In an embodiment, channels for respective packets are determined based on potential future congestion issues (e.g., the potential future congestion issues identified at S230, FIG. 2). More specifically, when a congestion issue is anticipated for one channel, packets intended to be sent via that channel may be rerouted in order to mitigate or avoid the anticipated congestion issue.

In an embodiment, S310 further includes scheduling the packets. The scheduling may be based on feedback received from the individual channels, the potential future congestion issues, combinations thereof, and the like. The scheduling is performed in order to regulate how much data is sent through a given channel at one time, and may be determined based on the feedback and, in particular, based on error messages or other feedback data indicating failure to transmit packets when the total amount of data being sent is above a certain amount.

At S320, at least some of the packets may be modified in order to support synchronization on the receiving end (i.e., for the systems or components receiving the packets over the different channels). More specifically, packets lacking timing data which may be needed for synchronization purposes are modified to include timing data such that an order of the packets can be determined using the timing data of each of the packets. As a non-limiting example, a timestamp may be added to each such packet. In this regard, it is noted that single channel congestion control algorithms may not require timing data and, therefore, packets normally sent via those channels may or may not include timing data. Thus, in some embodiments, packets are modified in order to provide this timing data. In an embodiment, the timing data may be added as metadata of the packets, for example, to a header of each modified packet.

At optional S330, a protocol to be used by each of the channels while transmitting the packets are selected. The protocols to be used may be determined using the feedback data from each of the channels. To this end, in an embodiment, S330 may include analyzing reliability feedback data for a given channel using different protocols available to that channel in order to determine an average or otherwise expected reliability for the channel while using the protocol. Protocols may be selected to ensure a threshold reliability, and the threshold reliability may either be a predetermined threshold or may be determined based on the scheduling of the packets.

At S340, the packets are sent via their respective channels according to the packet routing and the schedule. In a further embodiment, the packets are sent via each channel using the respective protocol sent via the channel.

Figure 4:
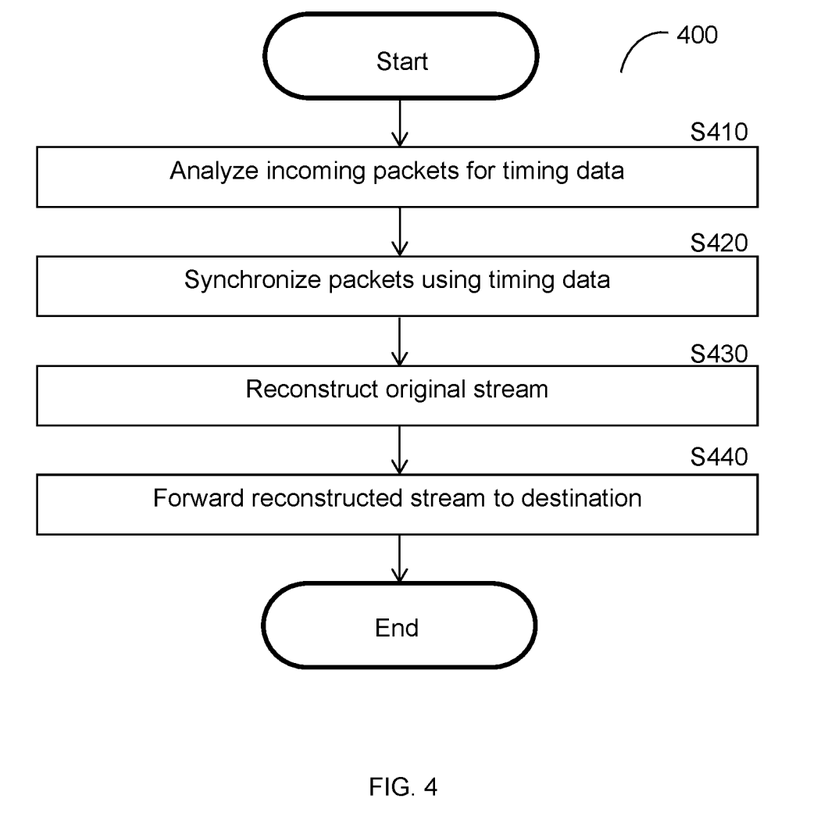
FIG. 4 is a flowchart illustrating a method for synchronizing traffic according to an embodiment.

FIG. 4 is a flowchart 400 illustrating a method for synchronizing traffic according to an embodiment. In an embodiment, the method is performed by the synchronizer 130, FIG. 1.

At S410, incoming packets are analyzed to identify timing data included therein. As noted above, the timing data may be added to the packets during scheduling. The timing data may be, but are not limited to being, included as metadata such that S410 may include analyzing metadata of the packets to identify the timing data. As a non-limiting example, headers of the packets may be analyzed for metadata indicating the timing data.

At S420, the incoming packets are synchronized using the timing data. Synchronizing the packets includes determining an order of the packets with respect to time. When the original data stream is reconstructed, the packets are arranged according to this order.

At S430, the original data stream is reconstructed using the synchronized packets. In an embodiment, S430 includes applying a buffer to accommodate variations in packet arrival time. As a non-limiting example, a jitter buffer may be applied. The result of S430 may be a data stream having the same content as the original. To this end, the data stream may be reconstructed as a group of packets with an order matching the original order of the packets within the original data stream. Alternatively, a payload may be extracted from each packet, and the payloads are combined according to the order of their respective packets in order to reconstruct the original data stream.

At S440, the reconstructed data stream is forwarded to its destination (e.g., the destination 140, FIG. 1). The destination may be indicated, for example, in the header of each packet. To this end, S440 may include analyzing the headers of one or more of the packets to identify the destination.

It should be noted that various embodiments discussed above are described with respect to a data stream including packets such that the packets are rerouted, but at least some disclosed embodiments may be applicable to data streams which are not already made up of packets. In such embodiments, the data stream may be broken up into packets such that each packet is a smaller segment of the larger data stream. Packet scheduling and synchronization may then proceed as described herein.

Figure 5:
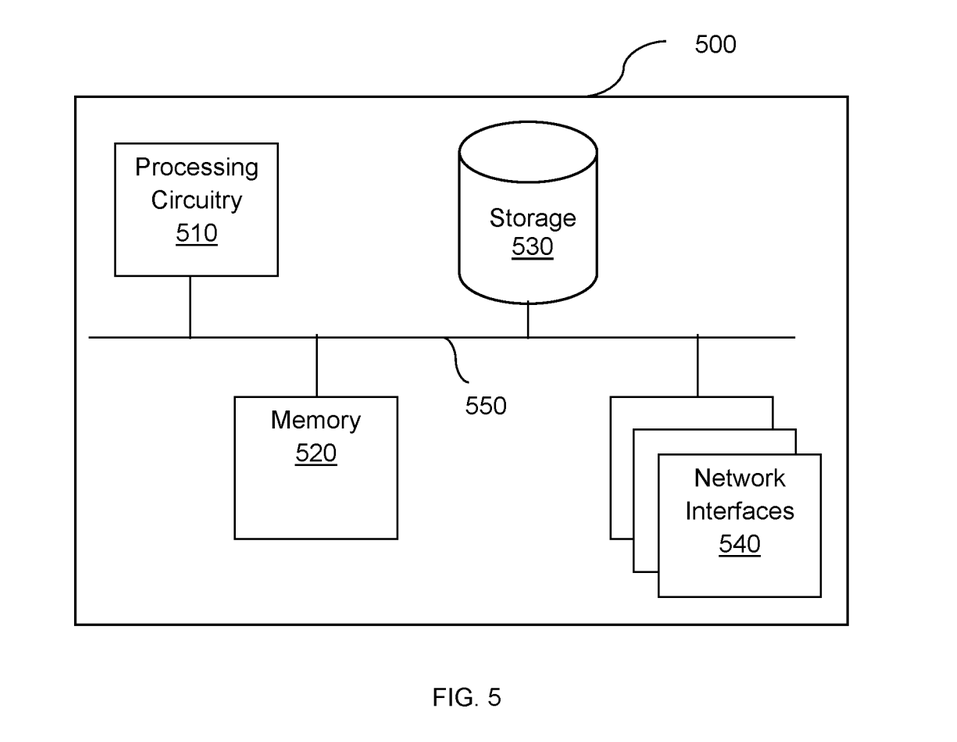
FIG. 5 is a schematic diagram of a hardware layer which can be utilized to implement one or more of the disclosed embodiments.

FIG. 5 is an example schematic diagram of a hardware layer 500 according to one or more embodiments. More specifically, the hardware layer 500 demonstrates an example hardware layer which may be utilized by one or more of the components configured to perform the processes discussed herein such as, but not limited to, the scheduler 120, the synchronizer 130, or both. The hardware layer 500 includes a processing circuitry 510 coupled to a memory 520, a storage 530, and one or more network interfaces 540. In an embodiment, the components of the hardware layer 500 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interfaces 540 allows the hardware layer to transmit packets, receive packets, or both.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for multi-channel network congestion control, comprising:
   establishing multi-channel control over a plurality of communication channels by connecting each of the plurality of communication channels to a scheduling component and to a synchronizing component;
   determining a packet routing scheme for a plurality of packets of a data stream based on feedback from each of the plurality of communication channels, wherein the packet routing scheme includes a routing of each packet to a respective communication channel of the plurality of communication channels; and
   sending the plurality of packets via their respective communication channels, wherein each of the sent packets includes timing data, wherein the synchronizing component is configured to synchronize the plurality of packets based on the timing data of each packet and to reconstruct the data stream using the synchronized packets.

2. The method of claim 1, further comprising:
   analyzing the feedback data from each of the plurality of communication channels to determine a responsiveness of each communication channel, wherein the packet routing scheme is selected based further on the responsiveness of each communication channel.

3. The method of claim 1, wherein the responsiveness of each communication channel is defined with respect to an average amount of time between identification and occurrence of congestion issues for the communication channel.

4. The method of claim 1, further comprising:
   analyzing the feedback data from each of the plurality of communication channels to determine a reliability of at least one protocol used by each communication channel; and
   selecting a protocol to be used by each of the plurality of communication channels based on the reliability of each protocol used by each communication channel.

5. The method of claim 1, further comprising:
   identifying at least one potential future congestion issue for the plurality of communication channels based on the feedback data from each of the plurality of communication channels, wherein the packet routing scheme is determined based further on the at least one potential future congestion issue.

6. The method of claim 5, wherein identifying the at least one potential future congestion issue further comprises:
   performing statistical modeling with respect to responsiveness for each of the plurality of communication channels based on the feedback data in order to determine at least one anticipated drop in responsiveness for at least one of the plurality of communication channels, wherein the at least one potential future congestion issue is the at least one anticipated drop in responsiveness.

7. The method of claim 1, further comprising:
   modifying at least one packet of the plurality of packets to include the timing data for the modified at least one packet.

8. The method of claim 7, wherein modifying the at least one packet includes adding a timestamp to a header of each of the at least one packet.

9. The method of claim 1, wherein the data stream is to be sent to a destination indicated among the plurality of packets, wherein the synchronizing component is further configured to forward the reconstructed data stream to the destination.

10. A non-transitory computer readable medium having stored thereon instructions for causing a processing circuitry to execute a process, the process comprising:
    establishing multi-channel control over a plurality of communication channels by connecting each of the plurality of communication channels to a scheduling component and to a synchronizing component;
    determining a packet routing scheme for a plurality of packets of a data stream based on feedback from each of the plurality of communication channels, wherein the packet routing scheme includes a routing of each packet to a respective communication channel of the plurality of communication channels; and
    sending the plurality of packets via their respective communication channels, wherein each of the sent packets includes timing data, wherein the synchronizing component is configured to synchronize the plurality of packets based on the timing data of each packet and to reconstruct the data stream using the synchronized packets.

11. A system for multi-channel network congestion control, comprising:
    a processing circuitry; and a memory, the memory containing instructions that, when executed by the processing circuitry, configure the system to:

establish multi-channel control over a plurality of communication channels by connecting each of the plurality of communication channels to a scheduling component and to a synchronizing component;

determine a packet routing scheme for a plurality of packets of a data stream based on feedback from each of the plurality of communication channels, wherein the packet routing scheme includes a routing of each packet to a respective communication channel of the plurality of communication channels; and send the plurality of packets via their respective communication channels, wherein each of the sent packets includes timing data, wherein the synchronizing component is configured to synchronize the plurality of packets based on the timing data of each packet and to reconstruct the data stream using the synchronized packets.

12. The system of claim 11, wherein the system is further configured to:

analyze the feedback data from each of the plurality of communication channels to determine a responsiveness of each communication channel, wherein the packet routing scheme is selected based further on the responsiveness of each communication channel.

13. The system of claim 11, wherein the responsiveness of each communication channel is defined with respect to an average amount of time between identification and occurrence of congestion issues for the communication channel.

14. The system of claim 11, wherein the system is further configured to:

analyze the feedback data from each of the plurality of communication channels to determine a reliability of at least one protocol used by each communication channel; and select a protocol to be used by each of the plurality of communication channels based on the reliability of each protocol used by each communication channel.

15. The system of claim 11, wherein the system is further configured to:

identify at least one potential future congestion issue for the plurality of communication channels based on the feedback data from each of the plurality of communication channels, wherein the packet routing scheme is determined based further on the at least one potential future congestion issue.

16. The system of claim 15, wherein the system is further configured to:

perform statistical modeling with respect to responsiveness for each of the plurality of communication channels based on the feedback data in order to determine at least one anticipated drop in responsiveness for at least one of the plurality of communication channels, wherein the at least one potential future congestion issue is the at least one anticipated drop in responsiveness.

17. The system of claim 11, wherein the system is further configured to:

modify at least one packet of the plurality of packets to include the timing data for the modified at least one packet.

18. The system of claim 17, wherein modifying the at least one packet includes adding a timestamp to a header of each of the at least one packet.

19. The system of claim 11, wherein the data stream is to be sent to a destination indicated among the plurality of packets, wherein the synchronizing component is further configured to forward the reconstructed data stream to the destination.

* * * * *